Feb. 14, 1950 G. H. WADE, SR 2,497,381
COMBINATION PROPAGATOR, INCUBATOR, AND BROODER
Filed May 2, 1947 2 Sheets-Sheet 1

Inventor
GEORGE H. WADE, SR.

By Randolph & Beavers
Attorneys

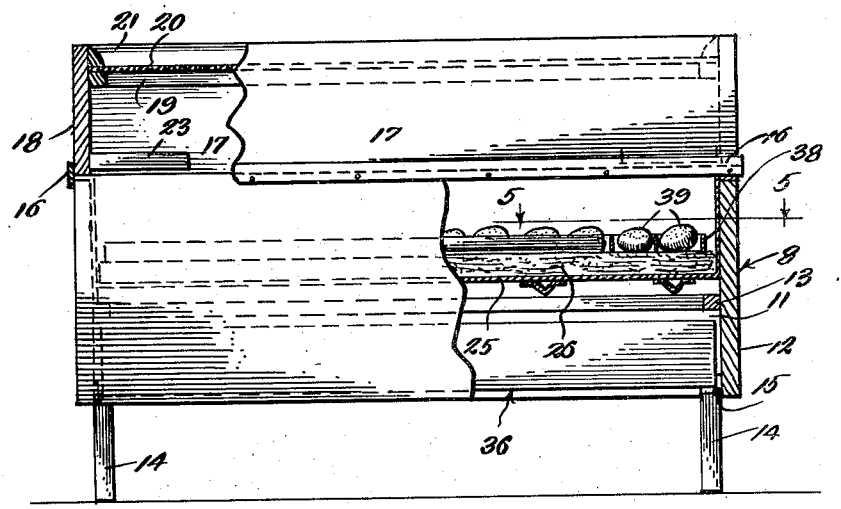
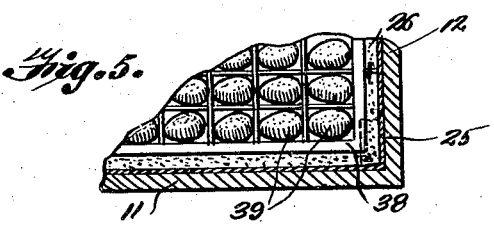
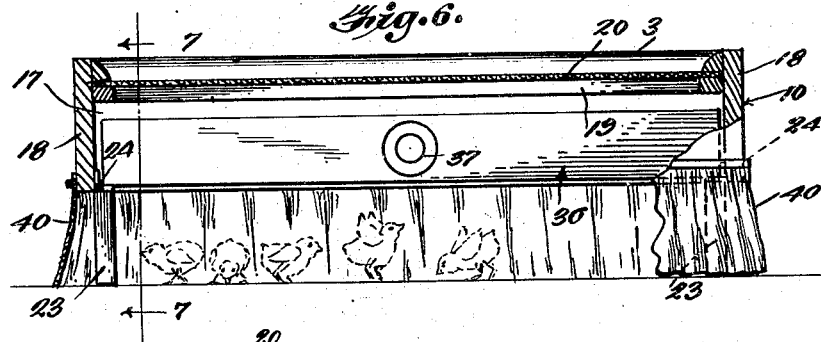
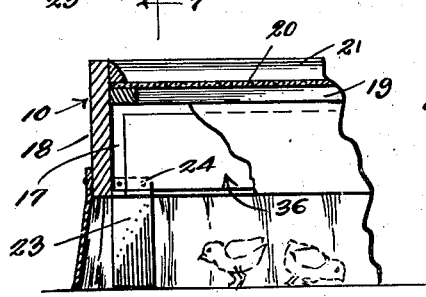

Patented Feb. 14, 1950

2,497,381

UNITED STATES PATENT OFFICE 2,497,381

COMBINATION PROPAGATOR, INCUBATOR, AND BROODER

George H. Wade, Sr., Manville, N. J.

Application May 2, 1947, Serial No. 745,675

3 Claims. (Cl. 47—19)

This invention relates to a device capable of being used for propagating young plants, as an incubator or as a brooder for young poultry and it is a primary object of the invention to provide a unique construction of housing or casing which readily adapts itself to the various aforementioned uses to thereby eliminate the necessity of having separate devices for each function.

More particularly, it is an object of the present invention to provide a housing or enclosure which is so constructed and arranged that various elements may be demountably contained thereon for adapting the structure for use as an incubator, propagator or brooder.

Numerous other objects and advantages of the invention will hereinafter become more fully apparent from the following description of the drawings, illustrating a preferred embodiment thereof, and wherein:

Figure 4 is a side elevational view, partly in vertical section and partly broken away and showing the structure assembled for use as an incubator;

Figure 5 is a fragmentary horizontal sectional view thereof taken substantially along a plane as indicated by the line 5—5 of Figure 4;

Figure 6 is a longitudinal vertical sectional view showing the structure assembled for use as a brooder, and Figure 7 is a fragmentary cross sectional view thereof taken substantially along a plane as indicated by the line 7—7 of Figure 6.

Figure 1:
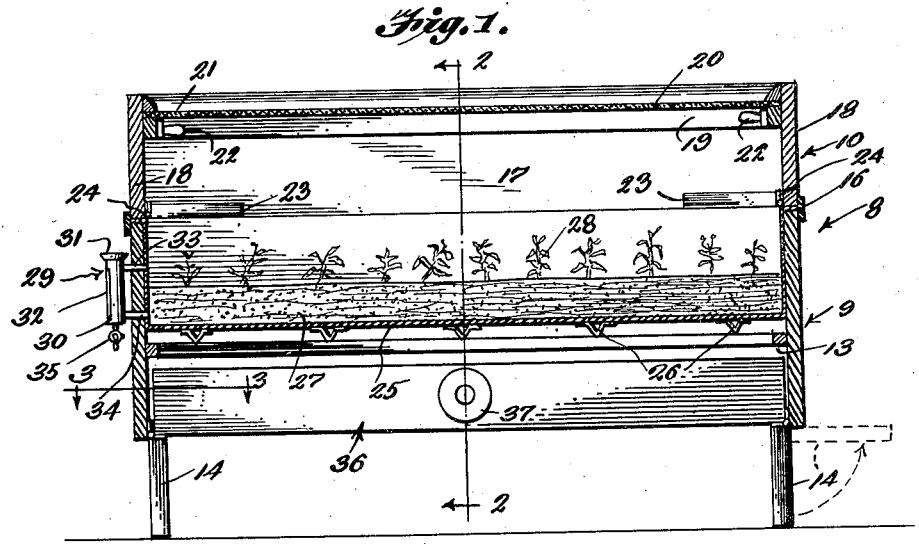
Figure 1 is a longitudinal sectional view illustrating the invention assembled for use as a propagator.

Referring more specifically to the drawings, the improved housing or enclosure in its entirety and constituting the invention is designated generally 8 and comprises a lower section 9 and an upper section 10.

The section 9 constitutes an elongated, substantially rectangular frame which is relatively deep and which is formed by substantially corresponding side walls 11 and end walls 12. The lower housing section 9 is provided with an internal beading or rib 13 which is shown as extending therearound, intermediate of its top and bottom and preferably closer to the bottom than to the top thereof, and which at least extends along the side walls 11. The lower section 9 is provided with a hinged leg 14, adjacent each corner thereof and at its bottom, each of said legs being connected by a hinge 15 to one of the end walls 12. The hinges 15 are located on the inner sides of the end walls 12 and are of the leaf type and have barrel portions disposed along the bottom edges of said end walls and each includes a leaf connected to the upper end of a leg 14, so that the legs 14 may be swung from a folded position within and substantially parallel to the bottom of the section 9 through an arc of approximately 180° to an outwardly extending position, as illustrated in dotted lines in Figure 1, all for a purpose which will hereinafter become apparent. A strip 16 of a relatively rigid material is secured around the outer side of the lower closure section 9 and has an upper edge portion projecting above the upper edge thereof and forming a retaining flange, for a purpose which will hereinafter become apparent.

The upper enclosure section 10 is of substantially the same length and width as the lower section 9 and also comprises side walls 17 and end walls 18, and is provided with an internal beading or rib 19 extending therearound near the upper edge thereof and forming a support for a transparent cover 20, which is preferably formed by a pane of glass. A retaining bead 21 is secured internally of the side and end walls 17 and 18, above the cover 20, for retaining the latter in its position of Figures 1 and 2. One or more pilot lamp bulbs are preferably mounted within the section 10 and supported by the beading 19, as indicated at 22. The section 10 is likewise provided with legs 23 at the corners of the bottom edges thereof and which are mounted on hinges 24 in the same manner and for the same purpose as the legs 14 and which are shown in Figures 1 and 2 folded into the section 10.

Figure 2:
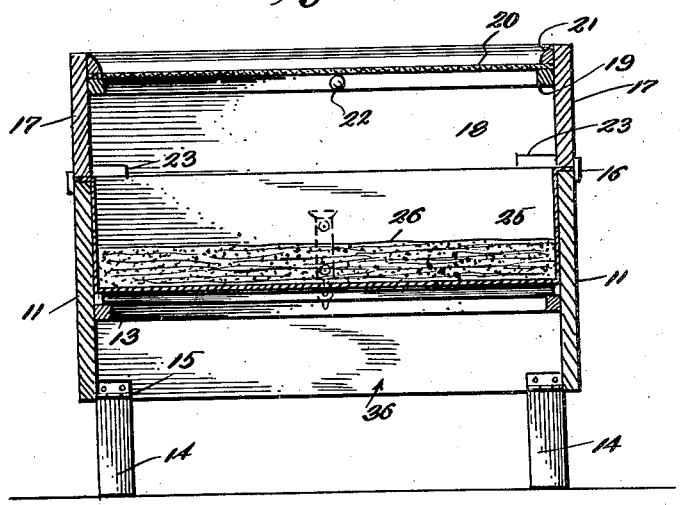
Figure 2 is a transverse vertical sectional view thereof taken substantially along a plane as indicated by the line 2—2 of Figure 1.

It will be readily apparent that the section 10 could be applied to the section 9 in superimposed relationship thereon with the legs 23 folded and that the upper portion or flange of the strip 16 will function as a retaining flange for holding the sections in superimposed relationship, as seen in Figures 1 and 2. For use of the enclosure 8 as a plant propagator, before the upper section 10 is applied to the lower section 9, a tray containing sand or soil is inserted into the section 9 through the top thereof. Said tray, as seen in Figures 1 and 2 and designated 25 is provided with side and end walls which fit relatively snug against the inner sides of the side and end walls 11 and 12 and which may be provided at their upper edges with flanges for engagement with the upper edges of the walls 11 and 12. The bottom of the tray 25 is provided on its underside with transversely extending ribs 26 of substantially V-shaped cross section, the end portions of which rest on the longitudinal portions of the bead or rib 13 for demountably supporting the tray 25 in the upper part of the enclosure section 9. The sand or soil 27, contained in the bottom portion of the tray 26, is shown in Figure 1 containing a plurality of plants 28 which extend upwardly therefrom.

A combination liquid level indicator, filling and draining attachment, designated generally 29 is shown in Figure 1 and includes a relatively large section of tubing or pipe 30 having a flared open upper end 31 and a transparent longitudinally extending window 32. Two lateral pipes 33 and 34 extend from the pipe 30 through an end wall 12 and into the tray 25 through an end wall thereof. The upper pipe 33 is disposed preferably above the level of the sand or soil 27 and the lower pipe 34 is disposed adjacent the bottom of the tray 25. The pipe 30 is provided with a bottom which is closed except for a drain valve 35. Accordingly, it will be readily apparent that water may be supplied to the tray 25 through the open upper end 31 of the member 29 and will flow therefrom through the pipe 33 for moistening the sand or soil 27. The water will also flow either to or from the tray 25 through the pipe 34 so as to maintain the level of the water within the tray and within the pipe 30 substantially uniform, so that the liquid level in the sand or soil 27 will be indicated through the window 32 where the liquid level within the pipe 30 can be observed. An excess of liquid within the tray 25 may be drained by opening the drain valve 35 and when additional water is required, the tray 25 may be refilled through the filling opening 31.

Figure 3:
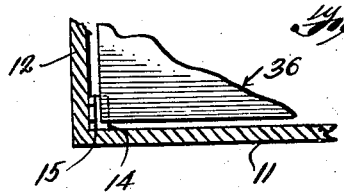
Figure 3 is a fragmentary horizontal sectional view taken substantially along a plane as indicated by the line 3—3 of Figure 1.

A conventional heating unit 36 of any conventional construction, preferably including a thermostat 37 is adapted to be detachably mounted in the lower part of the enclosure section 9 and is of a size and shape to fit relatively snug therein to afford a substantial closure for the open bottom of the section 9. The pilot lamps 22 are adapted to be utilized in a conventional manner for indicating the operation of the heating unit 36 and may be connected thereto in any conventional manner and said heating unit may likewise be connected to a source of electric current in any conventional manner. To apply the heating unit 36, each of the legs 14 is swung outwardly to its dotted line position of Figure 1 to sufficiently expose the bottom of the section 9 to permit insertion of the heating unit 36 therein. The legs 14 are then swung downwardly to their substantially perpendicular positions as seen in Figures 1 and 2 and so that the corners of the heating unit 36 will rest on the upper ends of the legs 14, as clearly illustrated in Figures 1 and 3, to thereby demountably support the heating unit in its positions of Figures 1 and 2. Thus, the legs 14 function not only to support the enclosure 8 in an elevated position with respect to a supporting surface but also act to demountably retain the heating unit 36 within the enclosure and in a position so that said heating unit will substantially close the open bottom thereof.

The use of the enclosure 8 as an incubator, is substantially identical with its use as a plant propagator. In Figure 4 it will be noted that the enclosure 8 is shown employed as an incubator and contains the tray 25 which contains a relatively thick layer of sand 26 in the bottom thereof on which rests a relatively large egg separator 38 which may be of any conventional construction and each of the cells of which is adapted to contain an egg 39 to be hatched and so that the individual eggs 39 rest on the sand 36 which is moistened in any desired manner, as by use of the attachment 29, not shown in Figure 4. The heat from the heating unit 36 will maintain the moistened sand 36 in a heated condition for hatching the eggs 39 resting thereon, and it will thus be readily apparent that the enclosure 8 is readily adapted for use either as a plant propagator or as an incubator.

Figures 6 and 7 illustrate the use of the structure as a brooder and wherein only the upper section 10 thereof is utilized. The legs 23 of the upper section 10 function in the same manner, as previously described, with respect to the legs 14, for demountably supporting the heat unit 36 within said upper section. A flexible curtain or apron 40 is fastened around the lower portion of the section 10 and depends therefrom to rest upon the supporting surface of the legs 23 to provide an enclosure through which baby chicks, as indicated in Figures 6 and 7, may readily enter or leave the brooder and which will also function to retain the heat from the heating unit 36 from escaping from beneath the section 10.

Various modifications and changes are contemplated and may obviously be resorted to, without departing from the spirit or scope of the invention as hereinafter defined by the appended claims.

I claim as my invention:

1. In a combination incubator, plant propagator and brooder of the character described, an enclosure provided with a closed top and an open bottom, a plurality of legs, hinges connected to the inner side of the enclosure adjacent the open bottom thereof and to the upper ends of the legs to permit outward swinging movement of the legs to positions for substantially completely exposing said open bottom, and a demountable heating unit removably mounted in the open bottom of said enclosure for heating the interior thereof, said legs being movable to substantially upright positions beneath the open bottom of the enclosure and engaging under and supporting the heating unit in the enclosure and for supporting said enclosure in an elevated position relatively to a supporting surface engaged by said legs.

2. A structure as in claim 1, a tray demountably supported in said enclosure above the heating unit and adapted to contain sand or soil for growing plants, said tray being heated by said heating unit, and said heating unit substantially filling and closing the open bottom of the enclosure beneath the tray.

3. A structure as in claim 1, a tray demountably supported in said enclosure above the heating unit and adapted to contain sand or soil for growing plants, said tray being heated by said heating unit, said enclosure being formed of separable, superimposed upper and lower sections, and means for demountably supporting the tray in the upper portion of the lower section, said tray being applied to or removed from the lower section through the open top thereof when the upper section is removed.

GEORGE H. WADE, Sr.

REFERENCES CITED

The following references are of record in the file of this patent:

UNITED STATES PATENTS

| Number | Name | Date |
| --- | --- | --- |
| 505,676 | Shaub | Sept. 26, 1893 |
| 901,153 | Clodi | Oct. 13, 1908 |
| 1,581,857 | Morison | Apr. 20, 1926 |
| 2,019,407 | Graves | Oct. 29, 1935 |
| 2,296,544 | Stewart | Sept. 22, 1942 |
| 2,296,860 | Martin | Sept. 29, 1942 |